US005623534A

United States Patent [19]
Desai et al.

[11] Patent Number: 5,623,534
[45] Date of Patent: Apr. 22, 1997

[54] METHOD AND APPARATUS FOR EXCHANGING ADMINISTRATIVE INFORMATION BETWEEN LOCAL AREA NETWORKS

[75] Inventors: Bhupesh J. Desai, Aurora; E-Ling Lou, Naperville; Albert J. Sawyer, Wheaton; James J. Sowa, Naperville, all of Ill.

[73] Assignee: Lucent Technologies Inc., Murray Hill, N.J.

[21] Appl. No.: 418,728

[22] Filed: Apr. 7, 1995

[51] Int. Cl.⁶ .................................................. H04Q 7/22
[52] U.S. Cl. ............................................ 379/59; 455/33.1
[58] Field of Search ................................ 379/58, 59, 60, 379/61, 63, 219, 220, 221, 246; 455/33.1, 33.2, 54.1; 370/17, 60.1

[56] References Cited

U.S. PATENT DOCUMENTS

| | | | |
|---|---|---|---|
| 5,353,331 | 10/1994 | Emery et al. | 379/58 |
| 5,481,603 | 1/1996 | Gutierrez et al. | 379/221 |
| 5,519,689 | 5/1996 | Kim | 370/17 |

*Primary Examiner*—Curtis Kuntz
*Assistant Examiner*—Michael B. Chernoff
*Attorney, Agent, or Firm*—Dennis J. Williamson

[57] ABSTRACT

The system of the invention has particular application to a wide area network (WAN) where call routing information often changes in one local area network (LAN) (e.g. a switching system) while other LANs (e.g. cellular communication systems) are unaware of the changes. Because of the heavy flow of traffic in such networks, the minimization of administrative traffic data is desirable. The invention solves the need for constant updating and auditing of the LANs in the WAN. One LAN is considered the master LAN for a given parameter and contains an accurate directory of administrative data for that parameter. Each of the other LANs operate on the assumption that the administrative or directory information it contains is correct. If this assumption is wrong for a particular parameter and a LAN contains incorrect information, in response to a communication to or from the LAN, the system: 1) recognizes that the information relating to the parameter is incorrect; 2) determines the correct information and completes the communication based upon the correct information; and 3) updates the LAN with the correct information from the master LAN such that the next time the same communication is attempted the LAN has the correct information. In this manner, the LANs are updated on a need to know basis only after an actual communication is attempted thereby eliminating the constant transmission of administrative information between the LANs that exists in the prior art systems.

18 Claims, 4 Drawing Sheets

METHOD AND APPARATUS FOR EXCHANGING ADMINISTRATIVE INFORMATION BETWEEN LOCAL AREA NETWORKS

BACKGROUND OF THE INVENTION

The invention relates, generally, to wide area networks (WANs) that consist of a number of local area networks (LANs) linked together to allow communication therebetween and, more particularly, to an improved method and apparatus for facilitating the exchange of administrative information between the LANs to minimize traffic due to administrative communications. The invention has particular applicability in minimizing the administrative traffic in a cellular telecommunications networks.

As will be appreciated, a LAN typically includes a number of processors linked together on a path such that they can communicate with one another. A WAN consists of a number of LANs communicating with one another over a network such as a public switched telephone network (PSTN), satellite transmission network or the like such that the LANs can communicate with one another to transfer information therebetween and/or function in a coordinated manner.

One common example of a WAN is a cellular telecommunications network. The typical cellular telecommunications network consists of a number of cell sites where each cell site includes a radio transmitter/receiver for communicating with mobile stations located in the cell served by that cell site. The cell sites are linked to one another and to a processor or processors on a path over which the cell sites and processor(s) can communicate with one another. The processor or processors in the cellular communications system include a call control for identifying mobile stations, assigning radio frequencies, routing calls and the like as will be understood by one skilled in the art. It will be appreciated that the typical cellular telecommunications network includes a number of these cellular communications systems serving different geographic areas. Each cellular communication system is linked to a switching system over voice trunks that transmit voice signals and a common channel signaling network that transmits call control signaling information. Each switching system includes linked processors that operate in coordination to route calls to and from the cellular communications systems, other switching systems and customer service lines. In such a telecommunications network it is considered that each of the cellular communications systems constitute a LAN as does each switching system and that these LANs form part of the cellular telecommunications network that constitutes the WAN.

In order for the LANs to properly communicate with one another, a directory of destinations or other administrative data is distributed to at least one processor in each of the LANs. If information in any of these processors is incorrect, the LANs will find it difficult or impossible to communicate with one another. Therefore, in existing WANs the administrative data in all of the LANs must be updated whenever the information in any LAN changes. It will be appreciated that in a telecommunications network, the traffic resulting from these updates is significant. Moreover, most WANs, in addition to the need for updating, perform regular audits of the entire WAN to ensure that all of the LANs are accounted for and properly communicating.

How often these updates and audits are transmitted over the WAN depends on the LAN protocols. Some protocols send out updates and/or audits every few minutes, others send out these messages every few seconds. While most WAN users never see these messages, this heavy flow of traffic over the WAN can cause link saturation and/or slow downs. Moreover, messages between LANs are typically transmitted over a connection oriented service such as a public switch telephone network (PSTN) where each administrative message is transmitted over a usage charged connection. As a result, the constant transmission of administrative messages not only uses valuable network resources but can also be expensive.

Thus, a problem exists in the art in that the existing updating and auditing systems for coordinating the communication of LANs in a WAN such as a telecommunications network increases network traffic, utilizes valuable network resources and is expensive.

SUMMARY OF THE INVENTION

The invention solves the above-noted problem by providing a system in which the constant updating and auditing of the LANs in a WAN are eliminated. In such a system, one LAN is considered the master LAN for a predetermined parameter and contains a directory of accurate administrative data for that parameter. The other LANs may or may not have accurate data for that parameter, however, each of the other LANs operates on the assumption that the administrative or directory information it contains regarding that parameter is correct. If this assumption is wrong and one of the other LANs contains incorrect information regarding the parameter, in response to a communication to or from that LAN, the system: 1) recognizes that the information is incorrect; 2) determines the correct information and completes the communication based upon the correct information; and 3) updates that LAN with the correct information from the master LAN such that the next time the same communication is attempted the LAN has the correct information. In this manner, the LANs are updated on a need to know basis only after an actual communication is attempted thereby eliminating the constant transmission of administrative information between the LANs that exists in the prior art systems. The system of the invention has particular application to a telecommunications network where call routing information often changes in a master LAN (e.g. a switching system) while the other LANs (e.g. cellular communication systems) are unaware of the changes. Because of the heavy flow of traffic in such networks, the minimization of administrative traffic data is desirable.

DETAILED DESCRIPTION

Figure 1:
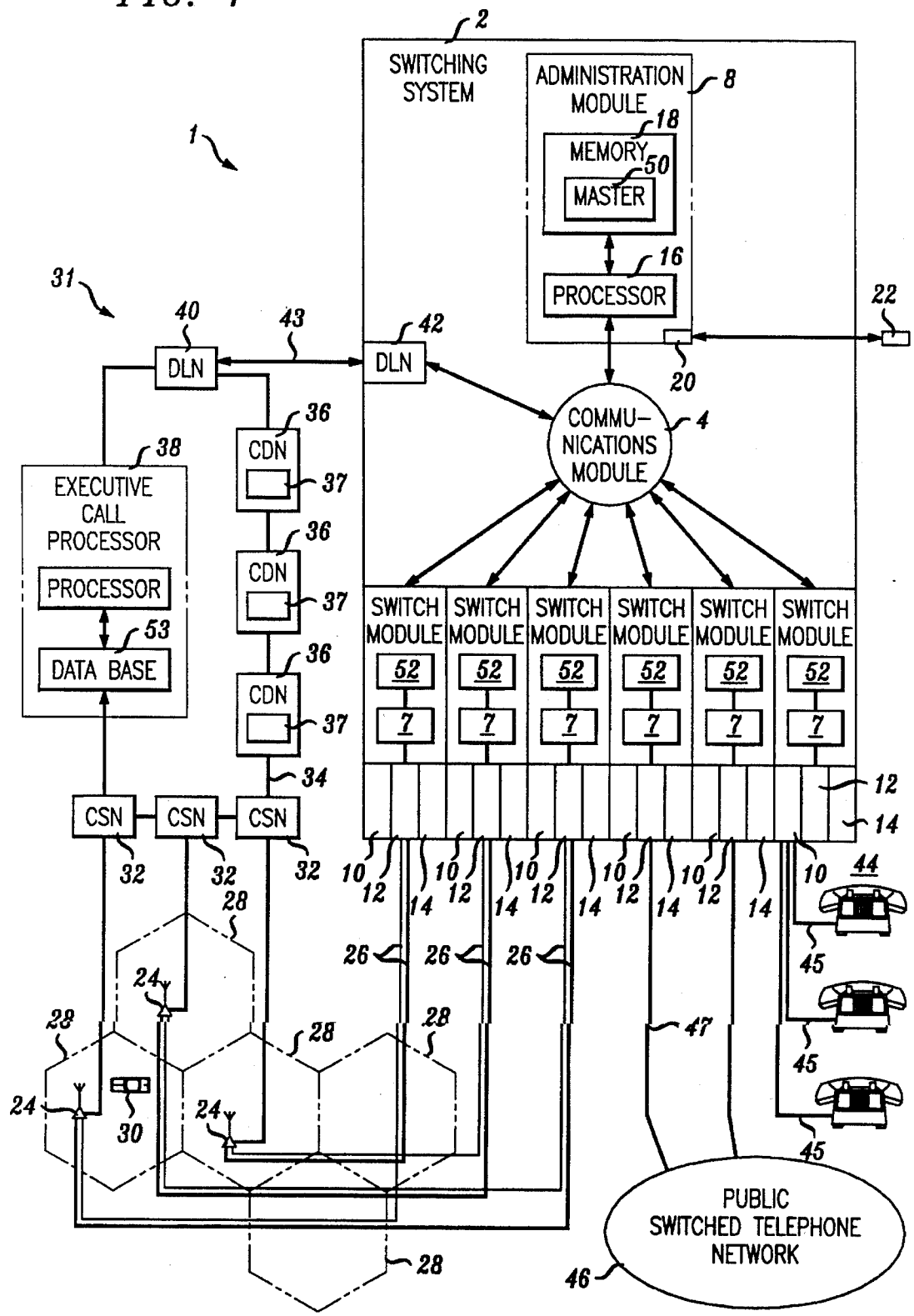
FIG. 1 is a block diagram of a cellular telephone network incorporating the system of the invention.

The operation of the system of the invention will be described with particular reference to the cellular telecommunications network shown generally at 1 in FIG. 1. It is to be appreciated, however, that the system of the invention will operate in WANs other than the illustrated embodiment. For example, the system of the invention will operate in a land line telecommunications network or in a network of personal computers such as found in universities or large businesses where the personal computers of one entity are linked together in a LAN and can communicate with LANs of other entities over a WAN.

Telecommunications network 1 includes a switching system 2 such as an ISDN electronic switching system as described in U.S. Pat. No. 4,592,048 issued to Beckner et al. on May 27, 1986. Such a switching system can be a 5ESS® switch, described in *AT&T Technical Journal*, Vol. 64, No. 6, part 2, pp. 1305–1564, July/August 1985, and manufactured by AT&T. The architecture of such a switching system includes a communication module 4 forming a hub and having a plurality of switch modules 6, and an administration module 8 emanating therefrom. Each switch module 6 is controlled by microprocessor 7 and provides call processing, time division switching, and signaling for the lines and trunks to which it is connected. Line units 10 provide interface to customer lines that connect to the customer premise equipment and trunk units 12 provide interface to the trunks that connect the other elements of the network such as switches. Finally, circuit units 14 provide tones, announcements, recorded messages, tone decoding and the like. The administration module 8 provides functions that can be centralized such as maintenance control, craft interface, text and data base management, call routing and time slot allocation. The administration module 8 consists of a control unit such as the AT&T 3B21D duplex processor 16 and main store memory 18. In some switching systems, the administration module is assisted by a separate processor that performs some administrative functions. The administration module 8 also includes an input/output processor 20 providing communication between the switching system 2 and peripheral devices 22 such as terminals, printers and the like. Communication module 4 is the hub of the switching system and allows communication between the administration module 8 and the switch modules 6. Communications module 4 consists of a message switch that provides the administration module-to-switch module, and switch module-to-switch module, message communication and a time multiplexed switch providing the switch module to switch module and switch module to administration module time slot connection for voice and data communication and the clock distribution.

A plurality of cell sites 24 are connected to the switch modules 6 of switching system 2 by a multiplicity of private facility trunk groups 26 as is known in the art. As is known, each cell site can consist of an AT&T Autoplex® series 2 Intelligent Base Station 2000 or other similar device. Each cell site operates over a geographic area or cell 28 and communicates with mobile stations 30 located in its cell via a radio transmitter/receiver as is well known. It is to be understood that one cell site is connected to a plurality of switch modules by one or more trunk groups 26.

Each cell site 24 is also connected with a cellular communication system 31 that allocates mobile path resources including assigning a communication path trunk and a radio channel. For purposes of illustration, the cellular communication system comprises an AT&T Autoplex® System 1000 although any switchable cellular communication system may be used. Cellular communication system 31 consists of a plurality of cell site nodes 32 connected to the cell sites. The cell site nodes 32 are connected to one another by a duplicated 64 Mb/s bus to form an interprocessor message switch ring or common network interface ring 34. Call processing/data base nodes 36 (CDNs) are attached directly to the common network interface ring 34 by a high speed dual port memory and include a processor such as the AT&T 3B15s microprocessor. Each CDN 36 is equipped with 128 Mbytes of physical memory although for most cellular systems less memory is actually required. An executive call processor 38, such as the AT&T 3B21D computer, is also connected to common network interface ring 34. The CDNs 36 communicate with executive call processor 38, with the cell site nodes 32, and with each other by sending and receiving messages over the common network interface ring 34.

In the illustrated configuration, the routine real-time intensive call processing functions are distributed among the CDNs 36. Each CDN 36 contains a memory resident copy of customer in data base 37 for all subscribers, and each can handle calls for any subscriber. Specifically, each CDN is responsible for call processing, audit control, voice channel administration, system integrity, automatic message accounting, overload control and the like. Executive call processor 38 retains overall executive control of the system although it is not responsible for call processing functions. Executive call processor 38 handles overall system maintenance, TTY interfaces, collects traffic and billing data, and contains the resident master copies of the system data bases and software generics. In an alternate embodiment, the processing functions described above as the responsibility of the CDNs, are not distributed to the CDNs 36, instead executive call processor 38 is responsible for all cellular call processing functions.

A data link node 40 on the common network interface ring 34 is connected to a data link node 42 of switching system 2 by a data link 43 of the common channeling signaling network. Data link node 42 is connected to the communications module 4 of switching system 1. Call control signaling is transmitted over this path to control the processing and routing of the voice signals over trunks 26. Specifically, data link nodes 40 and 42 include processors and interfaces for converting operating system messages to X.25 or SS7 signaling such that the switching system 2 and common network interface ring 34 can communicate.

Switch modules 6 can also be connected via customer service lines 45 to customer premise equipment (CPE) 44 such as telephone station sets, terminals, multimedia equipment or the like. Lines 45 are connected to the line units 10 of switch modules 6 as is well known such that calls terminating or originating at CPEs 44 are routed through switching system 2. Further, switching system 2 is connected to a telecommunications network such as the public switched telephone network 46 over trunk 47 such that calls can be routed between switching system 2 and the network 46.

It will be appreciated that the physical location (port) where a voice trunk 26 connects to switching system 2 is often changed to load balance the switching system and maintain its performance. Thus, the physical location of a voice trunk 26 in switching system 2 is defined by the trunk group, trunk member number and the switch module number of the switch module hosting the trunk group. If the switching system 2 has this information, it can locate the physical location (port) on switch module 6 to which any trunk member is connected. In this regard, the administration module 8 includes a data base 50 in memory 18 that includes a master list mapping the trunk group and trunk member number to the switch module number for all trunk groups hosted by the switching system. In this manner, the administration module 8, if provided with the trunk group and trunk member number, can identify the switch module 6 hosting that trunk group and member. Likewise, each switch module 6 includes a data base 52 that includes a mapping of trunk group and trunk member number to a port for the trunk groups and trunk members hosted by that switch module. Thus, once the administration module 8 identifies the proper switch module 6, the switch module can identify the physical port to which any trunk member is connected. In this manner, the physical location of the trunk members transmitting voice signals to and from switching system 2 can be identified, allowing switching system 2 to route the signals as is known.

In operation, when a request for a call set up is received from one of mobile stations 30, the cell site 24 serving the call, requests a voice channel (radio frequency) for that call from cellular communications system 31. Note that either executive call processor 38 or CDNs 36 assign the voice channel depending on whether call processing functions are distributed to the CDNs or centralized in the executive call processor. The voice channels are arranged in a one-to-one relationship with the trunk groups and trunk members connecting the cell sites 24 to the switching system 2 such that when a voice channel is selected by the cellular communications system, one, and only one, trunk group and trunk member is also selected. Executive call processor 38 of cellular communications system 31 includes a data base 53 including a look up table in which the voice channels are mapped to the trunk groups and members. When a voice channel is selected, cellular communication system 31 transmits the corresponding trunk group and trunk member number to the communication module 4 of switching system 2 over data link 43 such that switching system 2 can locate the physical connection (port) for the trunk member serving the call.

Existing systems allow the switching system to identify the location of the physical connection in one of two ways. First, the data base 53 of cellular communications system 31 could be provided only with the trunk group and trunk member number information (not the switch module number). In this case, the communications module 4, upon receipt of the call message signal over data link 43 from the cellular communications system 31, would forward the trunk group and trunk member number data to the administration module 8. The administration module 8, armed with the trunk group and trunk member number, searches data base 50 to identify the switch module hosting that trunk group and forwards that switch module number to the communications module 4. The communications module 4 then notifies the identified switch module of the trunk group and trunk member number serving that call. The switch module locates the physical port of the call by searching its local data base 52. The call could then be routed through the switching system 2 in the known manner.

It is apparent from the foregoing description that such a procedure requires repeated communication between the communications module 4 and the administration module 8 for every incoming call. This administrative traffic slows connection times and uses system resources that could be otherwise allocated. The advantage of such a system, however, is that executive call processor 38 does not have to be updated with new switch module information every time a trunk-to-port connection is changed on switching system 2.

An alternative to this system, is to store the switch module number of the switch module hosting the trunk member, as well as the trunk group and trunk member number, in data base 53 of executive call processor 38. Thus, the cellular communications system 31, when notifying the communications module 4 of the request for call set up, identifies the switch module, as well as trunk group and trunk member number, thereby eliminating the need for communication between the communication module 4 and administration module 8. As will be appreciated, in such a scenario the executive call processor data base 53 must have accurate information regarding the switch module number as well as for the trunk group and trunk member number. The accuracy of this information must be maintained by constantly updating executive call processor data base 53 from the master list in the administration module 8 over data link 43 and auditing the executive call processor to ensure that the information in data base 53 is accurate. The updating and auditing routines must be constantly run because if the information in data base 53 is incorrect, the switching system will not be able to determine the physical location of the trunk member and the call will not be able to be completed.

The above-described system, while minimizing traffic within switching system 2, creates a large volume of traffic between the switching system 2 and cellular communications network 31 over data link 43 from the auditing and updating routines that can lead to link saturation and slower connection times. Moreover, the risk of incomplete calls due to inaccurate information is increased.

The present invention provides a system for completing such connections that minimizes the disadvantages discussed above. Specifically, in the system of the invention, the executive call processor data base 53 is provided with a look up table mapping the trunk group, trunk number and switch module number to the voice channel. As a result, when a CDN selects a voice channel for a call originated at one of its cell sites, executive call processor 38 simultaneously transmits this information regarding the physical location of the trunk member to the communications module 4 of switching system 2. Unlike the existing methods, however, the information in data base 53 is not updated when there is a change in a connection between a switch module port and a trunk. Only the master list contained in data base 50 of the administration module 8 is updated, the information in the data base 53 is left incorrect. As a result, the updating and auditing traffic common to most WANs is eliminated. If desired, infrequent audits (i.e., hourly or daily) of the information in data base 53 could be conducted; however, such audits are not required.

The information in data base 53 is assumed to be correct and is provided to the communications module 4 upon a request for call set up. The communication module 4, in turn, identifies the switch module hosting the trunk member based upon this information and the switch module determines the physical location of the trunk member and is able to route the call as directed. Because the information in data base 53 is more likely correct than not, this is the normal process of operation for a network that is up and running and communication with administration module 8 is not needed.

If for some reason, the switch module information provided by data base 53 is incorrect, the identified switch module will not find a match for the trunk group and trunk member number and a failure message will be sent from the switch module 6 to the communication module 4. Upon receipt of this message, communications module 4 will forward the trunk group and trunk member number to the administration module 8 and the administration module 8 will determine the correct switch module from the master list and inform the communication module of the correct switch module such that the call can be completed. The process of returning to the administration module will occur only if the data from data base 53 is incorrect. Thus, for most calls the intraswitch traffic between the communication module 4 and the administration module 8 is not required.

After the administration module 8 identifies the correct switch module number and notifies the communications module 4, the communications module notifies the correct switch module and the call is completed in the known manner. Significantly, the administration module 8 through communications module 4 also sends a correction message back to the cellular communications system 31 updating data base 53 to include the correct switch module number for the selected voice channel. In this manner, the information in data base 53 is updated such that the error will not be repeated. The updated information is sent only when an error occurs such that regular updating and auditing of the LANs is eliminated. Moreover, the correction message is transmitted over the same data link connection between the cellular communications system 31 and communications module 4 as the original call set up request such that virtually no additional network resources are used in updating data base 53.

Another advantage of the system of the invention is that when a network such as shown in FIG. 1 is first installed, the switch module number information does not have to be input to the data base of every cellular communications system 31. Rather the cellular communications system 31 sends an incomplete set up message (i.e. without the switch module number) to the data link node 42. The data link node 42 recognizes the incomplete message and goes directly to the administration module 8 to determine the correct switch module number. The correct switch module then completes the call and data base 53 is updated with the correct switch module information as previously described. This process continues until all relevant switch module number information is in data base 53; however, the updating of data base 53 is on a need to know basis only after a call set up request is received such that there is no superfluous administrative traffic between the cellular communications system 31 and switching system 2. The data link node 42 also goes directly to the administration module 8 if unrecognizable information (rather than missing information) is transmitted from cellular communications system 31. If the data link node 42 is incorrect, and the cellular communications system information is accurate, the administration module 8 recognizes this fact and corrects information in the data link node 42 in the same manner that information in cellular communications system 31 is corrected.

Figure 2:
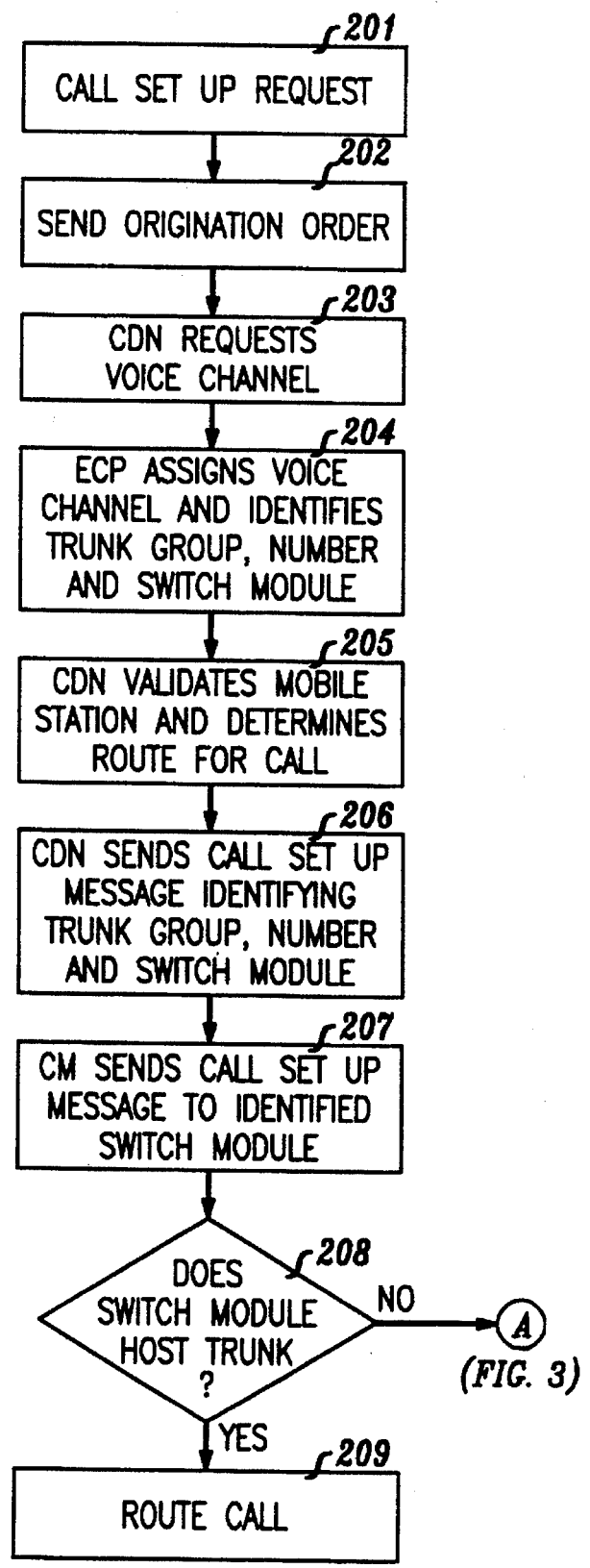
FIGS. 2 and 3 are flow diagrams illustrating the operation of the system of the invention.
Figure 3:
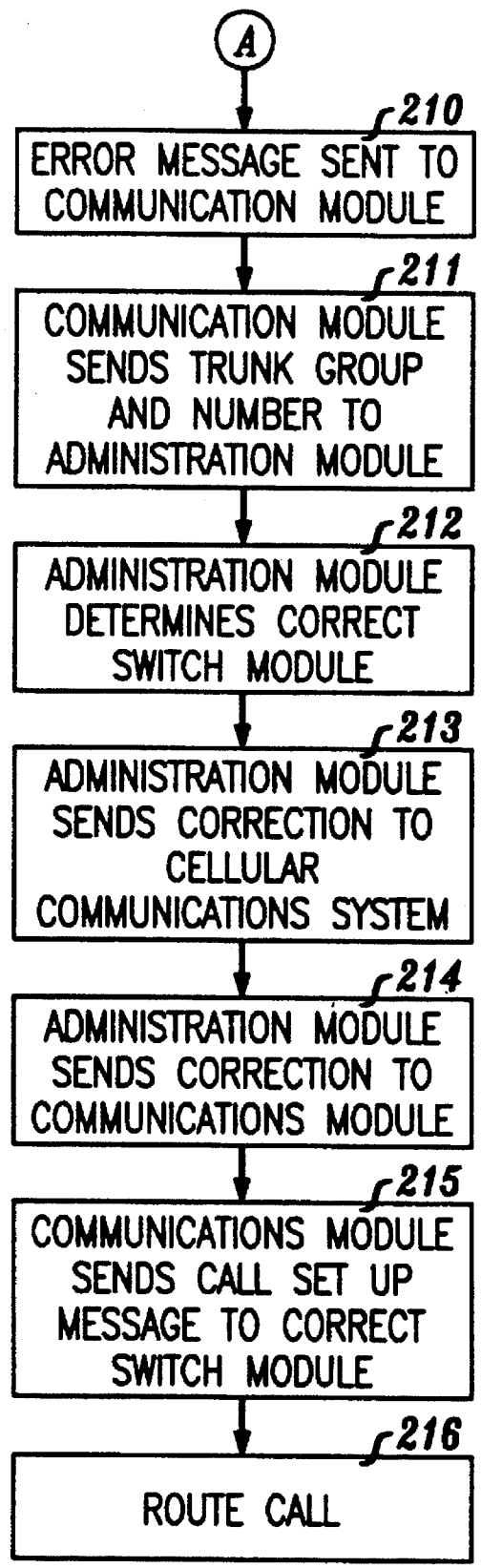
Figure 4:
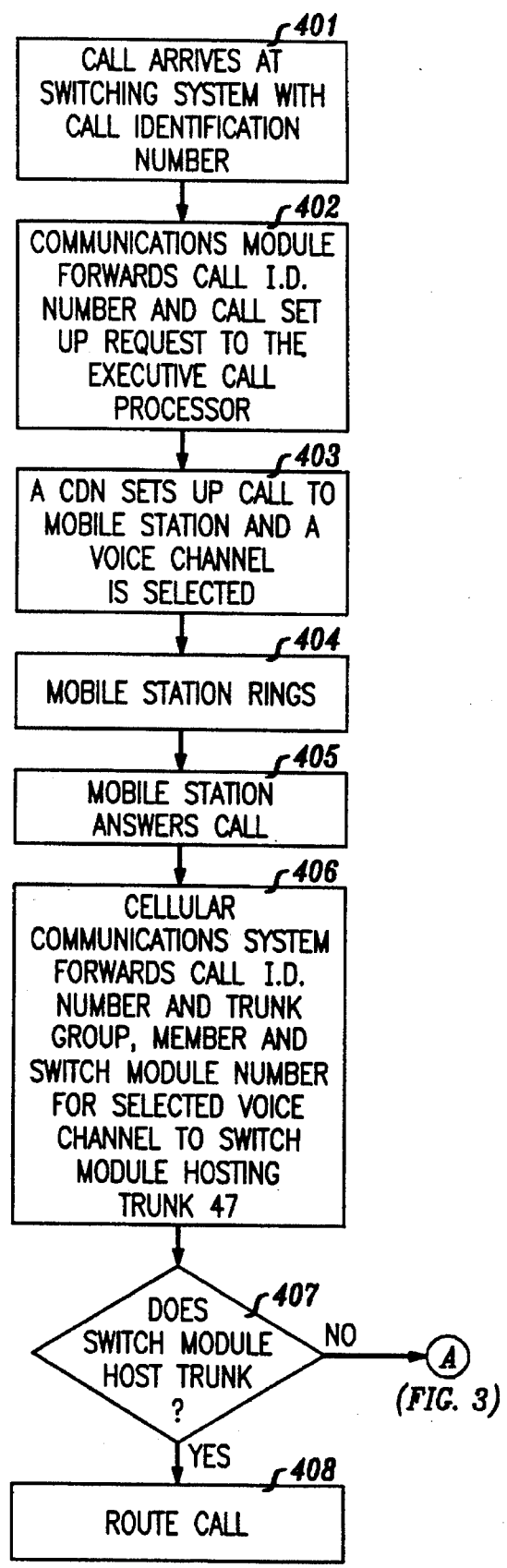
FIG. 4 is a flow diagram illustrating the further operation of the system.

The operation of the system of the invention will now be described with specific reference to the flow diagram of FIG. 2. The operation of the system begins when a mobile station originates a call set up request to the appropriate cell site (block 201). The cell site sends an origination order to one of the cell site node to which it is connected (block 202). The origination order goes to any available CDN, and the CDN requests a voice channel from the executive call processor (block 203). The executive call processor assigns a voice channel for the call and at the same time identifies the trunk group, trunk member number and the switch module number from data base 53 (block 204). The CDN validates the mobile station and determines a route for the call (block 205). The CDN then sends a call set up message to the communications module 4 of switching system 2 via data link 43 and data link nodes 40 and 42 identifying the trunk group, trunk member number and switch module number (likely parameter) corresponding to the assigned voice channel (block 206).

The communications module sends a call set up message directly to the switch module identified by the CDN (block 207). The switch module receiving the call set up message determines, from a look up in its own data base 52, if it hosts the trunk group and trunk member identified in the message (block 208). If the switch module is the host to the identified trunk group and trunk member, the call is routed to its ultimate destination in the known manner (block 209).

If the switch module does not host the identified trunk group and trunk member, an error condition exists. The switch module relays an error message to the communications module (block 210) and the communications module 4 sends the trunk group and trunk member number to the administration module 8 with a request that the administration module identify the correct switch module from the master list in data base 50 (block 211). The administration module determines the correct switch module (actual parameter) (block 212) and sends a correction message to the cellular communications system 31 to correct the switch module number (from the likely parameter to the actual parameter) for the assigned voice channel stored in data base 53 (block 213). The administration module also sends the correct switch module number to the communications module (block 214). The communications module then transmits the call set up message to the correct switch module (block 215). The correct switch module routes the call in the known manner (block 216). As a result of the system of the invention, calls are completed with a minimum of administrative traffic between the cellular communications system 31 and switching system 2 and between the communications module 4 and administration module 8.

While the operation of the system has been described with particular reference for the origination of a call, it has been discovered that the system of the invention is also advantageously employed for the termination end of a call as will be described with reference to FIGS. 1–4. For every call arriving at switching system 2 on trunk 47 from PSTN 46, the call includes administrative data including a call identification number that identifies the physical location on switching system 2 of the trunk member of trunk 47 handling the call (block 401). The communications module 4 communicates this information to executive call processor 38 with a request to set up a call to the identified calling station (block 402). One of CDNs 36 sets up the call, including selection of a voice channel (block 403), and the identified mobile station 30 rings (block 404). When mobile station 30 answers the call (block 405), a message is sent from executive call processor 38 to the switch module 6 hosting the trunk member of trunk 47 serving the call including the trunk group, trunk member number and switch module number for the trunk member of trunk 26 corresponding to the selected voice channel (block 406). If this information is correct, the switch module connected to trunk 47 is able to route the call directly to the switch module hosting the identified trunk member of trunk 26 with no need to return to the administration module 8 to determine the switch module (block 408). As with calls originating from cell sites 24, if the switch module number transmitted by cellular communications system 31 is incorrect, the network-side switch module transmits an error message to the administration module such that the correct switch module is identified and the switch module information is corrected in the cellular communications system 31 as previously described with respect to FIG. 3.

The use of the system of the invention is critical for termination calls because the switching system 2 does not receive the cell site trunk information until after the call is answered at mobile station 30. Thus, the customer is expecting immediate service and is aware of any delays in establishing a connection. Without the system of the invention, the switch module hosting trunk 47 must return to the administration module 8 to identify the switch module hosting the trunk corresponding to the selected voice channel for every call. This delay is noticeable to the customer answering the call at mobile station 30. As a result of the invention, the termination of calls is handled with minimal delay, customer inconvenience and administrative traffic.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. In a telecommunications network including a switching system having a plurality of switch modules, at least one of the switch modules hosting a trunk group consisting of a plurality of trunk members, said trunk members being connected to the switch modules at predetermined physical locations and a cellular communications system including a plurality of cell sites connected to said switching system by selected ones of the trunk members, said cell site including voice channels for communicating with customer stations, a method for routing calls comprising the steps of:

storing data in said switching system including master information identifying the physical location of all of said trunk members hosted by said switching system;

storing data in said cellular communications system including a mapping of the voice channels to the physical location of the selected ones of the trunk members;

assigning a particular voice channel to serve a call;

providing routing information to said switching system from said mapping identifying a likely location of the selected ones of the trunk member mapped to said particular voice channel;

determining if the routing information is usable by the switching system to route the call;

if the routing information is usable, routing the call using said information;

if the routing information is not usable, determining the actual physical location of the selected ones of the trunk member using the master information;

routing the call using the correct routing information; and correcting the routing information in said cellular communications system by updating said mapping.

2. The method of claim 1, wherein the step of assigning a particular voice channel includes the step of identifying one and only one of the selected trunk members from said mapping.

3. The method of claim 1, wherein the step of providing routing information includes the step of transmitting the routing information directly to a switch module.

4. The method of claim 1, wherein the step of determining is conducted in one of the switch modules.

5. The method of claim 1, wherein the step of assigning a voice channel is performed in response to a request from one of said plurality of cell sites for a call originating at said one of said plurality of cell sites.

6. The method of claim 1, wherein the step of assigning a voice channel is performed in response to a request from the switching system for a call terminating at one of said plurality of cell sites.

7. The method of claim 1, further including the step of identifying the trunk members by a trunk member identifier and identifying the switch modules by switch module identifier.

8. The method of claim 7, wherein the trunk member identifier includes a trunk group and a trunk member number and the switch module identifier includes a switch module number.

9. The method of claim 7, wherein said mapping of voice channels to the physical location includes the step of mapping the voice channels to at least said trunk member identifiers.

10. The method of claim 7, wherein the mapping of voice channels to the physical location includes the step of mapping each voice channel to one of the trunk member identifiers and one of the switch module identifiers.

11. The method of claim 7, further including the step of mapping each voice channel to one and only one of the trunk number identifiers.

12. The method of claim 7, wherein the master information includes a first mapping of trunk member identifiers to switch module identifiers and a second mapping of trunk member identifiers to physical locations.

13. The method of claim 12, further including the step of storing the first mapping in an administration module in said switching system.

14. The method of claim 12, further including the step of storing the second mapping in the switch modules.

15. The method of claim 14, wherein the step of determining the actual physical location includes the steps of identifying the switch module identifier from said first mapping and identifying the physical location from the second mapping.

16. The method of claim 10, wherein the step of providing routing information includes the step of transmitting the routing information directly to the switch module identified by said one of the switch module identifiers.

17. The method of claim 16, wherein the step of determining is conducted in the switch module identified by said one of the switch module identifiers.

18. The method of claim 16, wherein the step of determining includes the step of searching for said one of the trunk member identifiers in a mapping of trunk member identifiers to physical locations located in the switch module.

* * * * *